US011978990B2

(12) United States Patent
Wang

(10) Patent No.: US 11,978,990 B2
(45) Date of Patent: May 7, 2024

(54) ELECTRIC ENERGY TRANSMISSION ALUMINUM PART AND MACHINING PROCESS THEREFOR

(71) Applicant: JILIN ZHONG YING HIGH TECHNOLOGY CO., LTD., Changchun (CN)

(72) Inventor: Chao Wang, Changchun (CN)

(73) Assignee: JILIN ZHONG YING HIGH TECHNOLOGY CO., LTD., Changchun (CN)

(*) Notice: Subject to any disclaimer, the term of this patent is extended or adjusted under 35 U.S.C. 154(b) by 0 days.

(21) Appl. No.: 17/915,650

(22) PCT Filed: Apr. 1, 2021

(86) PCT No.: PCT/CN2021/084919
§ 371 (c)(1),
(2) Date: Sep. 29, 2022

(87) PCT Pub. No.: WO2021/197422
PCT Pub. Date: Oct. 7, 2021

(65) Prior Publication Data

US 2023/0163490 A1 May 25, 2023

(30) Foreign Application Priority Data

Apr. 1, 2020 (CN) ........................ 202010250103.9

(51) Int. Cl.
*H01R 4/20* (2006.01)
*H01B 7/04* (2006.01)
(Continued)

(52) U.S. Cl.
CPC ................ *H01R 4/20* (2013.01); *H01B 7/04* (2013.01); *H01B 7/282* (2013.01); *H01B 7/421* (2013.01);
(Continued)

(58) Field of Classification Search
CPC .................................. H01R 4/18; H01R 4/20
(Continued)

(56) References Cited

U.S. PATENT DOCUMENTS

| | | | | |
|---|---|---|---|---|
| 6,884,127 | B2 | 4/2005 | Souriau | |
| 2019/0221949 | A1* | 7/2019 | Bluemmel | H01R 4/2495 |

(Continued)

FOREIGN PATENT DOCUMENTS

| | | | |
|---|---|---|---|
| CN | 204760719 | U | 11/2015 |
| CN | 206195014 | U | 5/2017 |

(Continued)

OTHER PUBLICATIONS

International Search Report from corresponding International Application No. PCT/CN2021/084919, mailed Jun. 24, 2021, 4 pages with translation.

(Continued)

*Primary Examiner* — Chau N Nguyen
(74) *Attorney, Agent, or Firm* — Tucker Ellis LLP

(57) ABSTRACT

An electric energy transmission aluminum part and a machining process therefor including an aluminum conductive device (1) and an aluminum cable, with the aluminum cable including an aluminum conductive core (2) and an insulation layer (3) cladding a surface of the aluminum conductive core (2). An exposed section of the aluminum conductive core (2) with the insulation layer (3) stripped from the aluminum cable and at least part of the aluminum conductive core (2) clad with the insulation layer (3) are crimped inside the aluminum conductive device (1). A transition section (4) with a trapezoidal axial cross-section is provided at a junction between the insulation layer (3) and the exposed section of the aluminum conductive core (2) in the aluminum conductive device (1). Taking the transition section (4) as a demarcation point, an inner diameter of an (Continued)

end of the aluminum conductive device (1) that is crimped with the insulation layer (3) is greater than an inner diameter of an end of the aluminum conductive device (1) that is crimped with the aluminum conductive core (2). At least one concave structure is provided on a periphery of the aluminum conductive device (1). The concave structure provided on the surface of the aluminum conductive device (1) can effectively prevent the aluminum conductive device (1) from moving relative to a clamp, so as to solve the problem of displacement or rotation of the aluminum conductive device (1) in the clamp during welding, and improve the welding efficiency and the yield.

6 Claims, 1 Drawing Sheet

(51) Int. Cl.
*H01B 7/282* (2006.01)
*H01B 7/42* (2006.01)
*H01B 13/012* (2006.01)
*H01R 4/02* (2006.01)
*H01R 4/18* (2006.01)

(52) U.S. Cl.
CPC ....... *H01B 13/01236* (2013.01); *H01R 4/029* (2013.01); *H01R 4/187* (2013.01)

(58) Field of Classification Search
USPC ........................................................ 174/84 C
See application file for complete search history.

(56) References Cited

U.S. PATENT DOCUMENTS

| | | | | |
|---|---|---|---|---|
| 2021/0135379 | A1* | 5/2021 | Mochizuki | H01R 4/184 |
| 2022/0149547 | A1* | 5/2022 | Scharkowski | B23K 20/10 |
| 2022/0320764 | A1* | 10/2022 | Chvala | H01R 13/447 |

FOREIGN PATENT DOCUMENTS

| | | | |
|---|---|---|---|
| CN | 208423188 | U | 1/2019 |
| CN | 111312439 | A | 6/2020 |
| JP | H04162597 | A | 6/1992 |
| JP | 2018067426 | A | 4/2018 |
| JP | 2018133194 | A | 8/2018 |

OTHER PUBLICATIONS

Japanese Office Action from corresponding Japanese Application No. 2022-560263, dated Apr. 6, 2023; 6 pages with translation.
Extended European Search Report from corresponding European Application No. 21779946.9, dated Sep. 15, 2023; 22 pages.

* cited by examiner

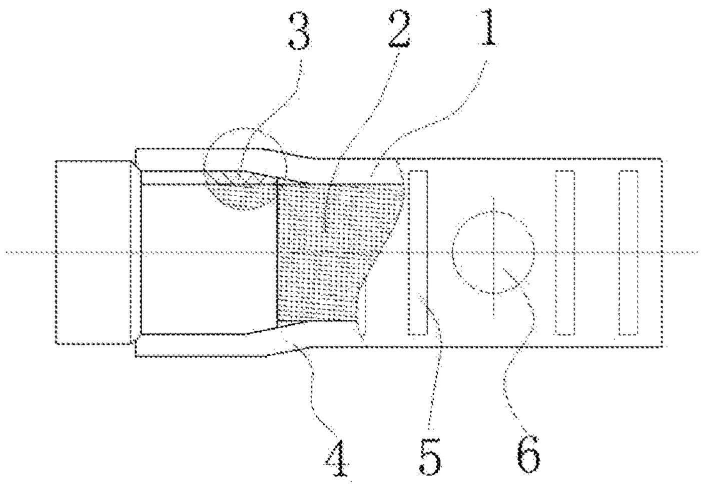
FIG. 1
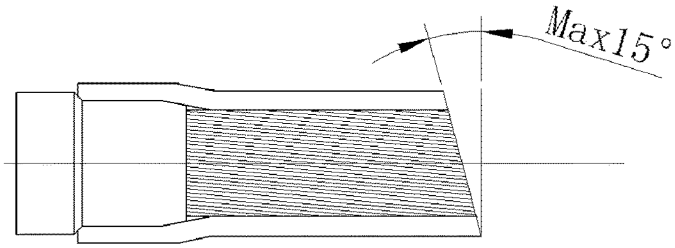
FIG. 2
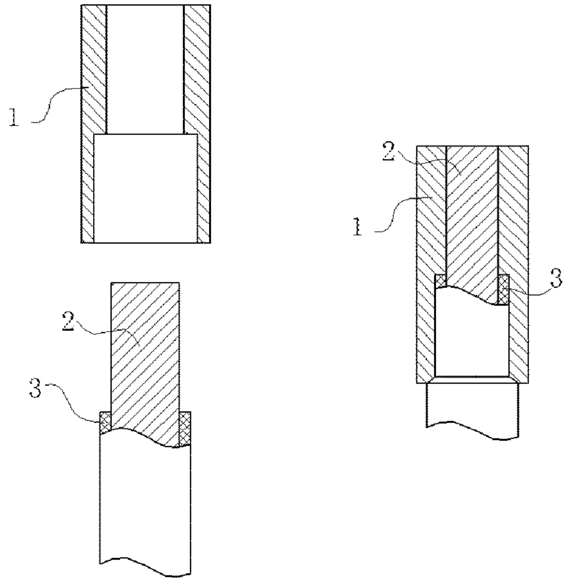
FIG. 3a
(PRIOR ART)
FIG. 3b
(PRIOR ART)

ELECTRIC ENERGY TRANSMISSION ALUMINUM PART AND MACHINING PROCESS THEREFOR

RELATED APPLICATION

The present disclosure claims priority to Chinese Patent Application No. 202010250103.9, entitled "electric energy transmission aluminum part and machining process therefor".

TECHNICAL FIELD

The present disclosure relates to a technical field of conductive metal connectors, and particularly to an electric energy transmission aluminum part, and a machining process for obtaining the electric energy transmission aluminum part.

BACKGROUND

With the increasing demand for the light weight of the wire harness, the application of the aluminum cable in the wire harness is also increasing. In addition, in order to match different use environments, the aluminum cable in the wire harness generally adopts a multi-core aluminum conductive core, which can make the aluminum cable more flexible and adapt to different use and mounting environments. In order to realize a better electrical connection between the aluminum cable and a matched electrical consumption device, before being connected to a same metal or a dissimilar metal, the multi-core aluminum conductive core of the aluminum cable is generally crimped into a hard structure by using an aluminum conductive device, so as to facilitate the connection with the same metal or the dissimilar metal.

As illustrated in FIGS. 3*a* and 3*b*, in the design of an existing aluminum conductive device 1, the internal shape of the aluminum conductive device 1 is designed according to the shape of the multi-core aluminum conductive core 2 exposed where the insulation layer is stripped. In order to match the step size of the insulation layer, the interior of the aluminum conductive device is generally designed into a stepped shape. Moreover, since the raw material for the machining of the aluminum conductive device is generally tubular or cylindrical, the outer surface of the aluminum conductive device is generally as smooth as the raw material.

However, such an aluminum conductive device with the smooth outer surface also has some defects when being welded with a same metal or a dissimilar metal. Because of the smooth surface of the aluminum conductive device, the aluminum cable sleeved with the aluminum conductive device will rotate or displace in a clamp of a welding device during welding, which not only increases the difficulty of welding, but also may cause the aluminum cable to be damaged during rotation or displacement and then lose the use function of the wire harness.

In addition, in the aluminum conductive device with the stepped interior, an inner step surface is matched with an end surface of the insulation layer of the cable. In a process of crimping the aluminum conductive device and the aluminum cable into a hard structure, the insulation layer is extruded, deformed and extended, causing a part of the insulation layer to be crimped into the aluminum conductive device and the multi-core aluminum conductive core, which increases a resistance of the multi-core aluminum conductive core, increases a heating value of the electric energy transmission aluminum part which has been electrified, and even causes a burning accident of the insulation layer of the aluminum cable.

In addition to the above problems, there is no public research in the prior art on the influences of the pressurized parameters of the aluminum conductive device and the status after crimping on the properties of the electric energy transmission aluminum part.

Therefore, in the technical field of conductive metal connectors, there is an urgent need for an electric energy transmission aluminum part capable of solving the above problems, and a machining process for obtaining the electric energy transmission aluminum part, which can improve the welding quality of the electric energy transmission aluminum part and prolong the service life thereof.

SUMMARY

In order to overcome the defects of the prior art, an objective of the present disclosure is to provide an electric energy transmission aluminum part. By improving the structure of the aluminum conductive device, the problem of displacement or rotation of the aluminum conductive device in the clamp during welding is solved, and the welding efficiency and the yield of the electric energy transmission aluminum part are improved.

In order to achieve the above objective, the present disclosure specifically adopts the following technical solutions.

An electric energy transmission aluminum part including an aluminum conductive device and an aluminum cable, with the aluminum cable including an aluminum conductive core and an insulation layer cladding a surface of the aluminum conductive core, wherein an exposed section of the aluminum conductive core with the insulation layer stripped from the aluminum cable and at least part of the aluminum conductive core clad with the insulation layer are crimped inside the aluminum conductive device; and a transition section with a trapezoidal axial cross-section is provided at a junction between the insulation layer and the exposed section of the aluminum conductive core in the aluminum conductive device; taking the transition section as a demarcation point, an inner diameter of an end of the aluminum conductive device that is crimped with the insulation layer is greater than an inner diameter of an end of the aluminum conductive device that is crimped with the aluminum conductive core, and at least one concave structure is provided on a periphery of the aluminum conductive device.

The present disclosure further provides a machining process of an electric energy transmission aluminum part including:

- a pre-assembling step: inserting the exposed section of the aluminum conductive core with the insulation layer stripped and a part of the aluminum conductive core clad with the insulation layer into the aluminum conductive device, and pressing the exposed section of the aluminum conductive core and the part of the aluminum conductive core with the aluminum conductive device using a compression device, to obtain a semi-finished electric energy transmission aluminum part; and a concave structure manufacturing step: mounting the semi-finished electric energy transmission aluminum part in a clamp of a welding device, and extruding a surface of the aluminum conductive device by a convex mold of the clamp to form a concave structure.

Compared with the prior art, the present disclosure has the following advantageous effects.

1. The electric energy transmission aluminum part according to the present disclosure is different from the general researches and the prior arts. In the general researches, it is considered that the increase of the cross-sectional area of the conductor of the electric energy transmission aluminum part will reduce the conductor resistance and decrease the heat value of the electric energy transmission aluminum part electrified, so a structure that reduces the cross-sectional area of the conductor is usually not provided on the electric energy transmission aluminum part. According to the present disclosure, instead of increasing the cross-sectional area of the conductor of the electric energy transmission aluminum part, concave structures such as grooves or recess holes are provided on the electric energy transmission aluminum part, so as to reduce the cross-sectional area of the electric energy transmission aluminum part. Although the cross-sectional area is reduced, the conduction current of the electric energy transmission aluminum part is not decreased, and the heat generation of the electric energy transmission aluminum part when being electrified can still be effectively avoided. The cross-sectional area of the conductor of the electric energy transmission aluminum part is reduced; meanwhile, the concave structures such as the grooves or the recess holes increase the surface area of the electric energy transmission aluminum part, promote the heat dissipation thereof, increase the unit current carrying capacity thereof, and improve the electrical conductivity thereof.

2. In the electric energy transmission aluminum part according to the present disclosure, the surface structure of the aluminum conductive device is improved, and by providing the concave structures such as the grooves or the recess holes on the electric energy transmission aluminum part, it can effectively prevent the aluminum conductive device from moving relative to the clamp, solve the problem of displacement or rotation of the aluminum conductive device in the clamp during welding, and improve the welding efficiency, the yield and the qualification rate.

3. In the electric energy transmission aluminum part according to the present disclosure, a transition section with a trapezoidal axial cross-section is provided in the aluminum conductive device, so it is possible to accommodate the extruded and extended portion of the insulation layer, and avoid the increase in the resistance of the aluminum conductor and the overheating of the lead after being electrified caused by the insulation layer being crimped into the aluminum conductor, thus reducing serious safety accidents.

4. Compared with the prior art, the present disclosure configures the depth of the concave structure of the electric energy transmission aluminum part, which avoids the failure of the mechanical and electrical properties of the electric energy transmission aluminum part to meet the use requirements caused by a concave structure with too large or too small depth, and ensures the optimal properties of the electric energy transmission aluminum part.

5. The electric energy transmission aluminum part of the present disclosure adopts different shapes of cross-sections to meet various practical environments, thus significantly extending the application range of the electric energy transmission aluminum part.

6. The present disclosure configures an inclined angle between a front end surface of the electric energy transmission aluminum part and a plane perpendicular to an axis of the electric energy transmission aluminum part, which avoids the invalid of the electric energy transmission aluminum part caused by the excessive inclined angle between the front end surface of the electric energy transmission aluminum part and the plane perpendicular to the axis and the interference with the practical environment, and extends the use scenes of the electric energy transmission aluminum part. Meanwhile, the present disclosure increases the stability of the same or dissimilar metal composite joint made by the electric energy transmission aluminum part, and improves the mechanical and electrical properties of the electric energy transmission aluminum part.

7. The present disclosure configures a compression ratio of the aluminum conductive core, thus avoiding the failure of the mechanical and electrical properties of the electric energy transmission aluminum part to meet requirements caused by incomplete compression or excessive compression of the aluminum conductive core.

8. A sealing ring or sealant is provided at a crimping position of the insulation layer and the aluminum conductive device according to the present disclosure, which not only improves the sealability at the crimping position of the insulation layer and enhances the waterproof performance, but also increases a fixing force on the insulation layer when the aluminum cable is bent or curved, so as to prevent the insulation layer from being detached from the crimping position thereof.

9. In the electric energy transmission aluminum part according to the present disclosure, by providing a concave structure on the aluminum conductive device, a surface area of the electric energy transmission aluminum part is increased, so the surface with the increased surface area can dissipate heat more effectively when the electric energy transmission aluminum part is electrified and generates heat. Therefore, the service life of the electric energy transmission aluminum part can be effectively prolonged, and a cross-sectional area of the aluminum conductive core can be reduced as much as possible on the premise of electric current conduction, thus reducing the cost of the wire harness with the electric energy transmission aluminum part.

BRIEF DESCRIPTION OF THE DRAWINGS

FIG. 1 illustrates a schematic structural diagram of an electric energy transmission aluminum part according to the present disclosure;

FIG. 2 illustrates a radial cross-sectional diagram according to the present disclosure;

FIG. 3*a* illustrates a schematic structural diagram of a general electric energy transmission aluminum part before machining in the background art;

FIG. 3*b* illustrates a schematic structural diagram of a general electric energy transmission aluminum part in the background art.

REFERENCE NUMERALS

1. aluminum conductive device; 2. aluminum conductive core; 3; insulation layer; 4. transition section; 5. groove; 6. blind hole.

DETAILED DESCRIPTION OF THE PREFERRED EMBODIMENTS

In order to further explain the technical means adopted by the present disclosure to achieve the intended objective and effects thereof, the specific implementations, structures, characteristics and effects of the present disclosure will be described in detail below with reference to the drawings and the exemplary embodiments.

The First Embodiment

As illustrated in FIG. 1, an electric energy transmission aluminum part includes an aluminum conductive device 1 and an aluminum cable. The aluminum cable includes an aluminum conductive core 2 and an insulation layer 3 cladding the surface of the aluminum conductive core 2. An exposed section of the aluminum conductive core 2 with the insulation layer 3 stripped from the aluminum cable and at least part of the aluminum conductive core 2 clad with the insulation layer 3 are crimped inside the aluminum conductive device 1. A transition section 4 with a trapezoidal axial cross-section is provided at a junction between the insulation layer 3 and the exposed section of the aluminum conductive core 2 in the aluminum conductive device 1. Taking the transition section 4 as a demarcation point, an inner diameter of an end of the aluminum conductive device 1 that is crimped with the insulation layer 3 is greater than an inner diameter of an end of the aluminum conductive device 1 that is crimped with the aluminum conductive core 2. At least one concave structure is provided on a periphery of the aluminum conductive device 1. During welding, an electric energy transmission aluminum part whose surface is assembled with a clamp of a welding device is prone to rotate or displace, thus affecting the welding efficiency and the welding performance. By providing the concave structure, the present disclosure can effectively prevent the electric energy transmission aluminum part from moving relative to the clamp. In addition, by providing the concave structure on the aluminum conductive device of the electric energy transmission aluminum part, the surface area of the electric energy transmission aluminum part is increased, so the surface with the increased surface area can dissipate heat more effectively when the electric energy transmission aluminum part is electrified and generates heat. Therefore, the service life of the electric energy transmission aluminum part can be effectively prolonged. In addition, the cross-sectional area of the aluminum conductive core can be reduced as much as possible on the premise of electric current conduction, thus reducing the cost of the wire harness with the electric energy transmission aluminum part. In this solution, the transition section 4 with the trapezoidal axial cross-section in the aluminum conductive device can accommodate the extruded and extended portion of the insulation layer, so as to avoid the insulation layer being crimped into the aluminum conductor, thus avoiding the overheating of the aluminum cable.

As a further exemplary solution, the aluminum conductive device may be, but is not limited to, a hollow conductive aluminum part, such as an aluminum sleeve or an aluminum casing.

As a further exemplary solution, on the basis of the First Embodiment, the concave structure of the present disclosure may be, but is not limited to, a groove 5 or a blind hole 6.

The depth of the concave structure has an influence on the firmness of the assembling between the clamp and the electric energy transmission aluminum part. Through experimental research, the inventor found that based on the above embodiment, as a further exemplary solution, the firmness of the assembling between the clamp and the electric energy transmission aluminum part is the highest when the depth of the concave structure is 0.5% to 80% of the wall thickness of the aluminum conductive device.

As a further exemplary solution, the aluminum conductive device is made of aluminum or aluminum alloy. In the technical field of conductive metal connectors, pure aluminum can be used as a material for the aluminum conductive device because of its low resistivity and high conductivity. However, the hardness of pure aluminum is small, so the aluminum conductive device may also be made of aluminum alloy with a high aluminum content.

As a further exemplary solution, the cross-section of the electric energy transmission aluminum part according to the present disclosure may be of irregular shape such as flat shape, wavy shape or special shape, or regular shape such as circular shape, elliptical shape, or polygonal shape. Considering the machining difficulty and the cost of the electric energy transmission aluminum part, in an exemplary solution of the present disclosure, the cross-section of the electric energy transmission aluminum part is of regular shape such as circular shape, elliptical shape, or polygonal shape. The welding of the electric energy transmission aluminum part with the cross-section of regular shape and the copper terminal generate evenly distributed welding energy, thus forming a welded seam with stable bonding.

As a further exemplary solution, an inclined angle between a front end surface of the electric energy transmission aluminum part and a plane perpendicular to an axis of the electric energy transmission aluminum part is no more than 15°. Before welding, a front end of the electric energy transmission aluminum part needs to be cut by a cutter to form a smooth end surface, and the inclined angle between this end surface and the plane perpendicular to the axis is no more than 15°. In a case where the inclined angle is greater than 15°, when the electric energy transmission aluminum part is used to make a same or dissimilar metal composite joint, a convex side of the end surface of the electric energy transmission aluminum part will contact a butt welded end firstly, and a lower side of the end surface of the electric energy transmission aluminum part contacts the butt welded end only after the convex side of the end surface is welded and deformed, such that the welding energy is uneven and the front end of the electric energy transmission aluminum part is not uniformly melt, which will affect the performance stability of the composite joint. In the present disclosure, as a further exemplary solution, the inclined angle between the front end surface of the electric energy transmission aluminum part and the plane perpendicular to the axis does not exceed 5° (as illustrated in FIG. 2).

As a further exemplary solution, a compression ratio of the aluminum conductive core according to the present disclosure is between 35% and 97%. The compression ratio is a ratio of a cross-sectional area of the aluminum conductive core that has been compressed to a cross-sectional area of the aluminum conductive core that has not been compressed. According to the present disclosure, researches show that that if the compression ratio of the aluminum conductive core is too small, the compressive deformation amount of the aluminum conductive core is too large. As a result, on one hand, the cross-sectional area of the aluminum conductive core is reduced, resulting in a decrease in the current conductivity of the aluminum conductive core, thereby causing the increase of the resistance of the aluminum conductive core and the increase of the calorific value, which may cause potential safety hazards; on the other hand, the diameter of the aluminum conductive core after compression is small, so the pressure that the electric energy transmission aluminum part can withstand is reduced correspondingly when the electric energy transmission aluminum part is used to make a same or dissimilar metal composite joint, and the welded seams are not tightly bonded, which degrades the mechanical and electrical properties of the composite joint. Therefore, as a further exemplary solution, the compression ratio of the aluminum conductive core according to the present disclosure is between 35% and 97%.

As a further exemplary solution, a sealing ring or sealant is provided at a crimping joint between the insulation layer and the aluminum conductive device according to the present disclosure. In subsequent assembly and use of the aluminum conductive device crimped with the insulation layer, the aluminum cable will be bent or curved, which may cause the insulation layer to detach from the crimping position, resulting in the loss of the insulating protection of the aluminum conductive core. By providing a rubber sealing ring or sealant, it is possible to not only improve the sealability at the crimping position of the insulation layer, and enhance the waterproof performance, but also increase the fixing force on the insulation layer when the aluminum cable is bent or curved, so as to prevent the insulation layer from being detached from the crimping position.

The present disclosure further provides a machining process of an electric energy transmission aluminum part, including:

a pre-assembling step: inserting an exposed section of an aluminum conductive core with an insulation layer stripped and a part of the aluminum conductive core clad with the insulation layer into an aluminum conductive device, and pressing the exposed section of the aluminum conductive core and the part of the aluminum conductive core with the aluminum conductive device using a compression device to obtain a semi-finished electric energy transmission aluminum part; and a concave structure manufacturing step: mounting the semi-finished electric energy transmission aluminum part in a clamp of a welding device, and extruding a surface of the aluminum conductive device by a convex mold of the clamp to form a concave structure.

The Second Embodiment

The electric energy transmission aluminum part is machined by the method according to the First Embodiment. In order to verify the influence of a ratio of a depth of the concave structure to a wall thickness of the aluminum conductive device on a pullout force and a voltage drop of the electric energy transmission aluminum part, the inventor investigates pullout forces and voltage drops of electric energy transmission aluminum parts made according to different ratios of the depth of the concave structure to the wall thickness of the aluminum conductive device.

In this embodiment, an angle between a front end surface of the electric energy transmission aluminum part and a plane perpendicular to the axis of the electric energy transmission aluminum part is 0°, and a compression ratio of the aluminum conductive core is 60%. Please see Table 1 for the results.

TABLE 1

Influence of a ratio of a depth of a concave structure to a wall thickness of an aluminum conductive device on properties of an electric energy transmission aluminum part

| No. | Ratio of the depth of the concave structure to the wall thickness of the aluminum conductive device (%) | | | | | | | | |
|---|---|---|---|---|---|---|---|---|---|
| | 0.2 | 0.3 | 0.4 | 0.5 | 0.7 | 1 | 5 | 10 | 20 |
| | Pullout force of the electric energy transmission aluminum part (N) | | | | | | | | |
| 1 | Drop | Drop | Drop | 356 | 524 | 726 | 882 | 1256 | 1648 |
| | Voltage drop of the electric energy transmission aluminum part (mV) | | | | | | | | |
| 2 | — | — | — | 0.49 | 0.48 | 0.47 | 0.45 | 0.42 | 0.41 |
| | Ratio of the depth of the concave structure to the wall thickness of the aluminum conductive device (%) | | | | | | | | |
| No. | 30 | 40 | 50 | 60 | 70 | 80 | 85 | 90 | 95 |
| | Pullout force of the electric energy transmission aluminum part (N) | | | | | | | | |
| 1 | 1942 | 2346 | 2519 | 2046 | 1582 | 1384 | 189 | Fracture | Fracture |
| | Voltage drop of the electric energy transmission aluminum part (mV) | | | | | | | | |
| 2 | 0.37 | 0.35 | 0.31 | 0.34 | 0.38 | 0.42 | 0.63 | — | — |

As can be seen from Table 1, in this embodiment, the inventor tests the pullout forces and the voltage drops of the electric energy transmission aluminum parts within a range where the ratio of the depth of the concave structure to the wall thickness of the aluminum conductive device is 0.2% to 95%. The results show that when the ratio is less than 0.5%, the electric energy transmission aluminum part cannot be fixed by the clamp since the concave structure on the electric energy transmission aluminum part is shallow, such that the electric energy transmission aluminum part drops from the clamp during welding. When the ratio is more than 80%, the mechanical strength decreases since concave structure on the electric energy transmission aluminum part is deep, such that the pullout force of the electric energy transmission aluminum part is less than 200 N, and the voltage drop is greater than 0.5 mV, which cannot meet the qualified standards of the mechanical and electrical properties of the electric energy transmission aluminum part. Moreover, when a large stress is applied during welding, the electric energy transmission aluminum part will be fractured, and the function of the electric energy transmission aluminum part cannot be realized.

The Third Embodiment

The electric energy transmission aluminum part is manufactured by the method according to the First Embodiment. In order to demonstrate the influence of an inclined angle between a front end surface of an electric energy transmission aluminum part and a plane perpendicular to the axis of the electric energy transmission aluminum part on a pullout force and a voltage drop of the electric energy transmission aluminum part, the inventor investigates pullout forces and voltage drops of electric energy transmission aluminum parts made according to different inclined angles between the front end surface of the electric energy transmission aluminum part and the plane perpendicular to the axis.

In this embodiment, the ratio of the depth of the concave structure to the wall thickness of the aluminum conductive device is 50%, and the compression ratio of the aluminum conductive core is 60%. Please see Table 2 for the results.

the mechanical and electrical properties of the electric energy transmission aluminum part. Therefore, as the inclined angle decreases, the voltage drop and the drawing force of the electric energy transmission aluminum part are increasingly ideal.

The Fourth Embodiment

The electric energy transmission aluminum part is machined by the method according to the First Embodiment.

TABLE 2

Inclined angle between a front end surface of an electric energy transmission aluminum part and a vertical plane of an axis thereof on properties of the electric energy transmission aluminum part

| | Inclined angle between the front end surface of the electric energy transmission aluminum part and the vertical plane of the axis thereof (°) | | | | | | | | |
|---|---|---|---|---|---|---|---|---|---|
| No. | | 0.5 | 1 | 1.5 | 2 | 2.5 | 3 | 3.5 | 4 |
| | Pullout force of the electric energy transmission aluminum part (N) | | | | | | | | |
| 1 | 3417 | 3328 | 3265 | 3142 | 2946 | 2894 | 2739 | 2652 | 2471 |
| | Voltage drop of the electric energy transmission aluminum part (mV) | | | | | | | | |
| 2 | 0.19 | 0.21 | 0.23 | 0.24 | 0.26 | 0.27 | 0.28 | 0.29 | 0.31 |

| | Included angle between the front end surface of the electric energy transmission aluminum part and the vertical plane of the axis thereof (°) | | | | | | | | | | | | | | |
|---|---|---|---|---|---|---|---|---|---|---|---|---|---|---|---|
| No. | 4.5 | 5 | 5.5 | 6 | 7 | 8 | 9 | 10 | 11 | 12 | 13 | 14 | 15 | 16 | 17 |
| | Pullout force of the electric energy transmission aluminum part (N) | | | | | | | | | | | | | | |
| 1 | 2263 | 2043 | 1673 | 1458 | 1135 | 1028 | 975 | 824 | 581 | 457 | 348 | 289 | 227 | 194 | 150 |
| | Voltage drop of the electric energy transmission aluminum part (mV) | | | | | | | | | | | | | | |
| 2 | 0.33 | 0.35 | 0.36 | 0.37 | 0.38 | 0.39 | 0.41 | 0.42 | 0.43 | 0.44 | 0.46 | 0.47 | 0.49 | 0.59 | 0.78 |

In this embodiment, the inventor tests the pullout forces and the voltage drops of the electric energy transmission aluminum parts within a range where the inclined angle between the front end surface of the electric energy transmission aluminum part and the plane perpendicular to the axis is 0° to 17°. The results in Table 2 show that when the inclined angle is greater than 5°, the pullout force of the electric energy transmission aluminum part is in a decline trend, and the mechanical property of the electric energy transmission aluminum part is degraded accordingly; the voltage drop of the electric energy transmission aluminum part is in a rising trend, and the electrical property of the electric energy transmission aluminum part is degraded accordingly. When the inclined angle is greater than 15°, the pullout force and the voltage drop of the electric energy transmission aluminum part cannot meet the requirements of In order to demonstrate the influence of a compression ratio of an aluminum conductive core on a pullout force and a voltage drop of the electric energy transmission aluminum part, the inventor investigates pullout forces and voltage drops of electric energy transmission aluminum parts made according to different compression ratios of the aluminum conductive core.

In this embodiment, the ratio of the depth of the concave structure to the wall thickness of the aluminum conductive device is 50%, and the inclined angle between the front end surface of the electric energy transmission aluminum part and the plane perpendicular to the axis of the electric energy transmission aluminum part is 0°. Please see Table 3 for the results.

TABLE 3

Influence of the compression ration of the aluminum conductive core on the properties of the electric energy transmission aluminum part

| | Compression ratio of the aluminum conductive core (%) | | | | | | | | | | | |
|---|---|---|---|---|---|---|---|---|---|---|---|---|
| No. | 10 | 20 | 30 | 35 | 36 | 37 | 38 | 39 | 40 | 50 | 60 | 70 |
| | Pullout force of the electric energy transmission aluminum part (N) | | | | | | | | | | | |
| 1 | 89 | 132 | 184 | 218 | 382 | 516 | 714 | 1075 | 1258 | 1495 | 1827 | 2530 |
| | Voltage drop of the electric energy transmission aluminum part (mV) | | | | | | | | | | | |
| 2 | 0.97 | 0.84 | 0.67 | 0.49 | 0.46 | 0.44 | 0.42 | 0.39 | 0.37 | 0.26 | 0.17 | 0.12 |

TABLE 3-continued

Influence of the compression ration of the aluminum conductive core on the properties of the electric energy transmission aluminum part

| No. | Compression ratio of the aluminum conductive core (%) 80 | 90 | 91 | 92 | 93 | 94 | 95 | 96 | 97 | 98 | 99 | 100 |
|---|---|---|---|---|---|---|---|---|---|---|---|---|
| | Pullout force of the electric energy transmission aluminum part (N) | | | | | | | | | | | |
| 1 | 2486 | 1745 | 1568 | 1345 | 1175 | 976 | 745 | 482 | 231 | 140 | 54 | 0 |
| | Voltage drop of the electric energy transmission aluminum part (mV) | | | | | | | | | | | |
| 2 | 0.15 | 0.19 | 0.24 | 0.28 | 0.32 | 0.37 | 0.41 | 0.45 | 0.48 | 0.64 | 0.78 | 0 |

In this embodiment, the inventor tests the pullout forces and the voltage drops of the electric energy transmission aluminum parts within a range where the compression ration of the aluminum conductive core is 10% to 100%. The results in Table 3 show that when the compression ratio is less than 35% or greater than 97%, the pullout force of the electric energy transmission aluminum part is in a decline trend, the pullout force is less than 200 N, and the mechanical property of the electric energy transmission aluminum part is degraded accordingly; and the voltage drop of the electric energy transmission aluminum part is in a rising trend, which affects the electrical property of the electric energy transmission aluminum part. When the compression ratio is 35% to 97%, the voltage drop and the pullout force of the electric energy transmission aluminum part are both within ideal ranges.

The Fifth Embodiment

The electric energy transmission aluminum part according to the First Embodiment is manufactured. In order to demonstrate the influence of a sealing ring or sealant provided at a crimping position of the insulation layer and the aluminum conductive device on an ultimate pressure of the electric energy transmission aluminum part and number of bending times during detaching, the inventor investigates the ultimate pressures and the number of bending times when the crimping position of the aluminum conductive device is not provided with a sealing ring or sealant, only provided with a sealing ring, and only provided with a sealant.

In this embodiment, the ratio of the depth of the concave structure to the wall thickness of the aluminum conductive device is 50%, and the inclined angle between the front end surface of the electric energy transmission aluminum part and the plane perpendicular to the axis of the electric energy transmission aluminum part is 0°. Please see Table 4 for the results.

TABLE 4

Influence of a sealing ring or sealant on properties of an electric energy transmission aluminum part

| | Type: Without a sealing ring or sealant | | With a sealing ring | | With a sealant | |
|---|---|---|---|---|---|---|
| Experiment | Ultimate pressure (MPa) | Number of bending times during detaching | Ultimate pressure (MPa) | Number of bending times during detaching | Ultimate pressure (MPa) | Number of bending times during detaching |
| 1 | 0.43 | 6 | 0.58 | 8 | 0.67 | 10 |
| 2 | 0.46 | 5 | 0.56 | 9 | 0.69 | 12 |
| 3 | 0.45 | 6 | 0.57 | 9 | 0.69 | 13 |
| Average value | 0.45 | 5.7 | 0.57 | 8.7 | 0.68 | 11.7 |

The experiments in the above table show the following content.

1. The ultimate pressure: placing the electric energy transmission aluminum part in water, and inflating the aluminum cable of the electric energy transmission aluminum part until bubbles occur from the electric energy transmission aluminum part in the water, and then recording the air pressure.

2. The number of bending times during detaching: fixing the electric energy transmission aluminum part, bending the aluminum cable at the same distance from the electric energy transmission aluminum part for 90° repeatedly until the insulation layer is detached from the crimping position of the aluminum conductive device, and then recording the number of bending times.

As can be seen from the experiments in the above table, when a sealing ring or sealant is provided at the crimping position of the insulation layer and the aluminum conductive device, the ultimate pressure and the number of bending times during detaching are obviously better than those of the electric energy transmission aluminum part without a sealing ring or sealant. Therefore, the inventor prefers to provide a sealing ring or sealant at the crimping position of the insulation layer and the aluminum conductive device.

The Sixth Embodiment

In order to demonstrate the difference between the electric energy transmission aluminum part according to the present disclosure and those according to other design methods, the inventor manufactures the electric energy transmission aluminum part according to the method of the First Embodiment, and manufactures an electric energy transmission aluminum part composed of the conventional aluminum conductive device with a smooth outer surface and a stepped interior mentioned in the background art. The inventor investigates and compares the pullout forces and the voltage drops of the electric energy transmission aluminum parts according to the present disclosure and in the background art, as well as the pullout forces and the voltage drops after 1,000 hours of salt spray experiment, 200 hours of continuous current experiment, and 6,000 hours of aging experiment. Please see Tables 5-1 and 5-2 for the results.

TABLE 5-1

Influence of pullout forces and voltage drops of electric energy transmission aluminum parts in the background art and according to the present disclosure (before experiment and after 1,000 hours of salt spray experiment)

| | Electric energy transmission aluminum part in the background art | | Electric energy transmission aluminum part according to the present disclosure | | Electric energy transmission aluminum part in the background art | | Electric energy transmission aluminum part according to the present disclosure | |
|---|---|---|---|---|---|---|---|---|
| | Status | | | | | | | |
| | After manufacturing | | | | After 1,000 hours of salt spray experiment | | | |
| Experiment | Pullout force (N) | Voltage drop (mV) | Pullout force (N) | Voltage drop (mV) | Pullout force (N) | Voltage drop (mV) | Pullout force (N) | Voltage drop (mV) |
| 1 | 2357 | 0.35 | 3126 | 0.32 | 2053 | 0.43 | 2687 | 0.36 |
| 2 | 2563 | 0.38 | 3186 | 0.28 | 2132 | 0.45 | 2743 | 0.37 |
| 3 | 2476 | 0.37 | 3146 | 0.31 | 2186 | 0.43 | 2756 | 0.37 |
| 4 | 2542 | 0.39 | 3254 | 0.31 | 2164 | 0.45 | 2833 | 0.36 |
| 5 | 2344 | 0.37 | 3187 | 0.32 | 2082 | 0.45 | 2846 | 0.35 |
| 6 | 2461 | 0.38 | 3142 | 0.28 | 2125 | 0.46 | 2913 | 0.37 |
| 7 | 2387 | 0.38 | 3248 | 0.27 | 2068 | 0.46 | 2695 | 0.37 |
| 8 | 2554 | 0.37 | 3085 | 0.28 | 2081 | 0.44 | 2789 | 0.36 |
| 9 | 2488 | 0.39 | 3162 | 0.31 | 2162 | 0.45 | 2778 | 0.38 |
| 10 | 2453 | 0.38 | 3198 | 0.31 | 2185 | 0.47 | 2864 | 0.35 |
| Average value | 2462.5 | 0.38 | 3173.4 | 0.299 | 2123.8 | 0.449 | 2790.4 | 0.364 |

TABLE 5-2

Influence of pullout forces and voltage drops of electric energy transmission aluminum parts in the background art and according to the present disclosure (after 200 hours of continuous current experiment and 6,000 hours of aging experiment)

| | Electric energy transmission aluminum part in the background art | | Electric energy transmission aluminum part according to the present disclosure | | Electric energy transmission aluminum part in the background art | | Electric energy transmission aluminum part according to the present disclosure | |
|---|---|---|---|---|---|---|---|---|
| | Status | | | | | | | |
| | After 200 hours of high and low temperature experiment | | | | After 600 hours of aging experiment | | | |
| Experiment | Pullout force (N) | Voltage drop (mV) | Pullout force (N) | Voltage drop (mV) | Pullout force (N) | Voltage drop (mV) | Pullout force (N) | Voltage drop (mV) |
| 1 | 2146 | 0.43 | 2597 | 0.37 | 2073 | 0.47 | 2848 | 0.37 |
| 2 | 2073 | 0.45 | 2683 | 0.38 | 2137 | 0.46 | 2785 | 0.37 |
| 3 | 2128 | 0.43 | 2658 | 0.35 | 2028 | 0.47 | 2856 | 0.36 |
| 4 | 2057 | 0.44 | 2715 | 0.35 | 2142 | 0.46 | 2785 | 0.36 |
| 5 | 2074 | 0.42 | 2781 | 0.36 | 2075 | 0.49 | 2885 | 0.34 |
| 6 | 2054 | 0.45 | 2588 | 0.37 | 2048 | 0.48 | 2935 | 0.34 |
| 7 | 2093 | 0.46 | 2645 | 0.36 | 2057 | 0.45 | 2913 | 0.37 |
| 8 | 2121 | 0.44 | 2768 | 0.39 | 2137 | 0.48 | 2768 | 0.36 |
| 9 | 2155 | 0.42 | 2653 | 0.37 | 2033 | 0.48 | 2866 | 0.38 |
| 10 | 2162 | 0.46 | 2586 | 0.35 | 2147 | 0.46 | 2964 | 0.36 |
| Average value | 2106.3 | 0.44 | 2667.4 | 0.365 | 2087.7 | 0.47 | 2860.5 | 0.361 |

As can be seen from the results in Tables 5-1 and 5-2, an initial pullout force of the electric energy transmission aluminum part according to the present disclosure is much higher than that of the electric energy transmission aluminum part in the background art, and an initial voltage drop of the electric energy transmission aluminum part according to the present disclosure is significantly lower than that of the electric energy transmission aluminum part in the background art. After being subjected to 1,000 hours of salt spray experiment, 200 hours of high and low temperature experiment, and 6,000 hours of aging experiment, respectively, the pullout force of the electric energy transmission aluminum part according to the present disclosure is still much higher than that of the electric energy transmission aluminum part in the background art. After the experiments, the pullout force of the electric energy transmission aluminum part in the background art is clearly lowered, and the mechanical property is unstable, which may cause the function failure of the electric energy transmission aluminum part, thus leading to a short circuit of the aluminum cable and even a burning accident in severe cases. After the experiments, the voltage drop of the electric energy transmission aluminum part according to the present disclosure is substantially the same as the initial voltage drop of the electric energy transmission aluminum part in the background art. However, after the experiments, the voltage drop of the electric energy transmission aluminum part in the background art is significantly decreased, the electrical property is unstable, and the contact resistance of the electric energy transmission aluminum part rises, such that the electric energy transmission aluminum part becomes hot and red when being electrified, and burns in severe cases due to an excessive temperature and causes serious accidents.

Those described are only exemplary embodiments of the present disclosure, and cannot limit the protection scope of the present disclosure. Any insubstantial change or substitution made by those skilled in the art on the basis of the present disclosure should fall within the protection scope of the present disclosure.

The invention claimed is:

1. An electric energy transmission aluminum part, comprising an aluminum conductive device and an aluminum cable, with the aluminum cable comprising an aluminum conductive core and an insulation layer cladding a surface of the aluminum conductive core;

wherein an exposed section of the aluminum conductive core with the insulation layer stripped from the aluminum cable and at least part of the aluminum conductive core clad with the insulation layer are crimped inside the aluminum conductive device;

a transition section with a trapezoidal axial cross-section is provided at a junction between the insulation layer and the exposed section of the aluminum conductive core in the aluminum conductive device; taking the transition section as a demarcation point, an inner diameter of an end of the aluminum conductive device that is crimped with the insulation layer is greater than an inner diameter of an end of the aluminum conductive device that is crimped with the aluminum conductive core;

more than one concave structure provided on a periphery of the aluminum conductive device and disposed at intervals along an axis of the electric energy transmission aluminum part, and a depth of each concave structure is 0.5% to 80% of a wall thickness of the aluminum conductive device;

a front end of the electric energy transmission aluminum part is cut to form a smooth and planar front end surface.

2. The electric energy transmission aluminum part according to claim 1, wherein the aluminum conductive device is made of aluminum or aluminum alloy.

3. The electric energy transmission aluminum part according to claim 1, wherein an inclined angle between the front end surface of the electric energy transmission aluminum part and a plane perpendicular to an axis of the electric energy transmission aluminum part is no more than 15°.

4. The electric energy transmission aluminum part according to claim 1, wherein an inclined angle between the front end surface of the electric energy transmission aluminum part and a plane perpendicular to an axis of the electric energy transmission aluminum part is no more than 5°.

5. The electric energy transmission aluminum part according to claim 1, wherein a compression ratio of the aluminum conductive core is between 35% and 97%.

6. A machining process of the electric energy transmission aluminum part according to claim 1, comprising:

a pre-assembling step: inserting the exposed section of the aluminum conductive core with the insulation layer stripped and a part of the aluminum conductive core clad with the insulation layer into the aluminum conductive device, and pressing the exposed section of the aluminum conductive core and the part of the aluminum conductive core with the aluminum conductive device using a compression device, to obtain a semi-finished electric energy transmission aluminum part, wherein a transition section with a trapezoidal axial cross-section is provided at a junction between the insulation layer and the exposed section of the aluminum conductive core in the aluminum conductive device; taking the transition section as a demarcation point, an inner diameter of an end of the aluminum conductive device that is crimped with the insulation layer is greater than an inner diameter of an end of the aluminum conductive device that is crimped with the aluminum conductive core;

a concave structure manufacturing step: mounting the semi-finished electric energy transmission aluminum part in a clamp of a welding device, and extruding a surface of the aluminum conductive device by a convex mold of the clamp to form more than one concave structure on a periphery of the aluminum conductive device and disposed at intervals along an axis of the electric energy transmission aluminum part, wherein a depth of each concave structure is 0.5% to 80% of a wall thickness of the aluminum conductive device; and cutting a front end of the electric energy transmission aluminum part to form a smooth and planar front end surface of the electric energy transmission aluminum part.

* * * * *